United States Patent Office 3,594,203
Patented July 20, 1971

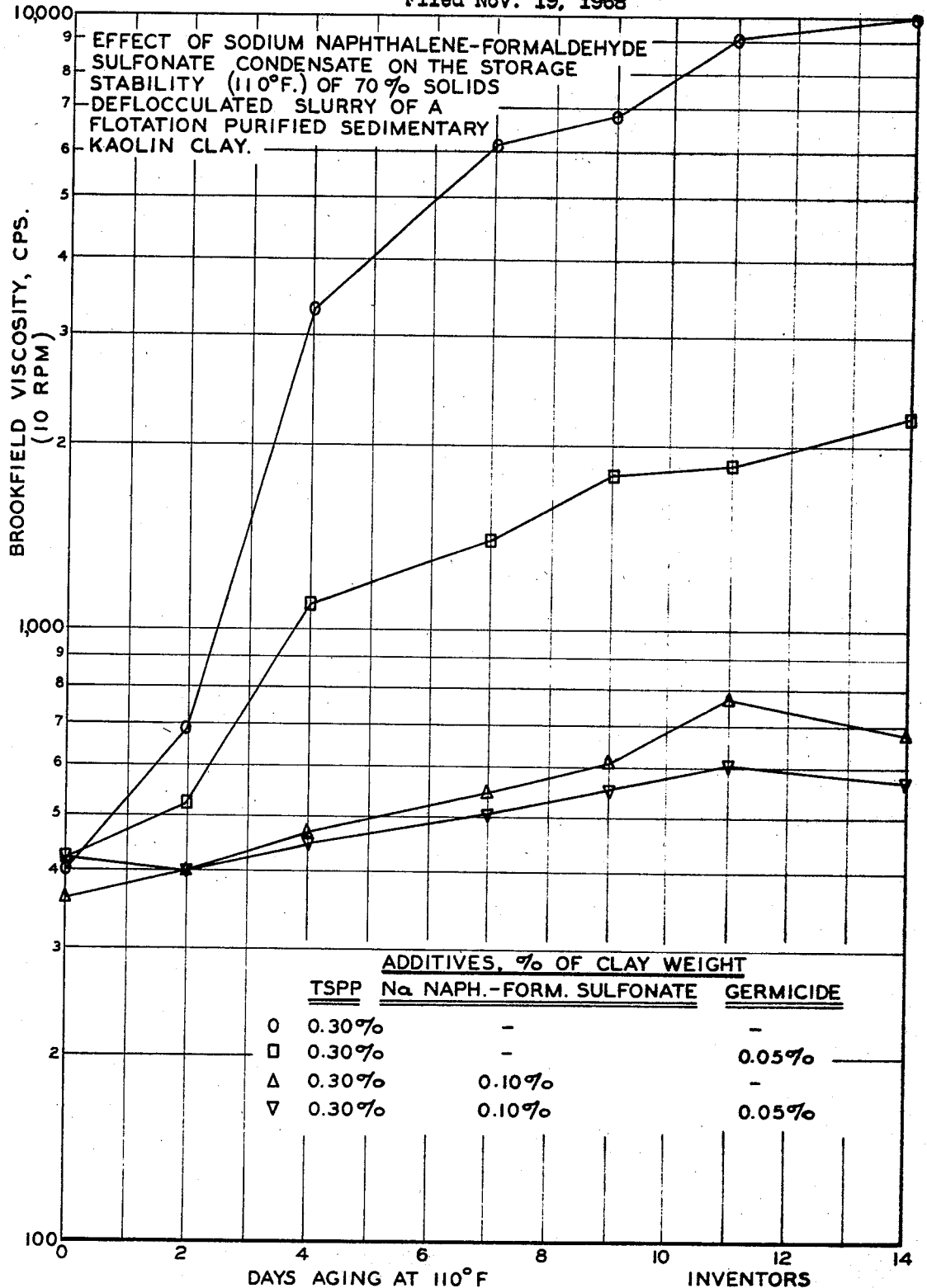

3,594,203
VISCOSITY STABILIZED CLAY SLURRIES
Edgar W. Sawyer, Jr., Edison, and Walter L. Haden, Jr., Metuchen, N.J., Louis L. Petty, Irwinton, Ga., and Barry S. Miller, Roselle, N.J., assignors to Engelhard Minerals & Chemicals Corporation, Woodbridge, N.J.
Filed Nov. 19, 1968, Ser. No. 777,105
Int. Cl. C09c 1/42
U.S. Cl. 106—288B
7 Claims

ABSTRACT OF THE DISCLOSURE

A high solids slurry of a kaolin clay coating pigment obtained by the flotation of colored impurities from sedimentary Georgia kaolin clay is deflocculated and the viscosity of the deflocculated slurry is adjusted to a minimum value with tetrasodium pyrophosphate. A small amount of an organic polyanionic polymer is incorporated in the slurry as a stabilizer. The quantity of organic polymer is such that the viscosity of the freshly prepared slurry is substantially unchanged by its presence.

BACKGROUND OF THE INVENTION

Kaolin clay is widely used as a pigment for coating paper. Frequently the clay is supplied in the form of a high solids slurry, e.g., a slurry containing about 70% clay solids on a weight basis. The slurry must remain fluid and pumpable during shipment and storage. Preferably, the viscosity should be substantially unchanged between preparation and eventual use. Clay slurries prepared at coating plants from dry clay products, such as "predispersed" spray dried clay, also should be capable of being stored without excessive thickening. It is common practice in the paper industry to express the viscosity as that of a fully deflocculated 70% solids slurry by means of a Brookfield viscometer at 10 r.p.m. using the technique described in "Standard Test Methods" of the Technical Association of the Pulp and Paper Industry.

High solids kaolin slurries invariably contain a condensed phosphate dispersant such as sodium hexametaphosphate, sodium tripolyphosphate or tetrasodium pyrophosphate. In the absence of the dispersant the clay-water system would be a semisolid mass. Some clay slurries containing condensed phosphate dispersants are capable of being transported and/or stored without thickening appreciably. Other slurries, however, rapidly increase in viscosity during storage or transportation and some ultimately gel. Storage of the slurries at temperatures above 70° F. is especially conducive to gelation.

In recent years flotation-beneficiated sedimentary kaolin clay has pre-empted a significant portion of the market for coating clays. The flotation-purified sedimentary clay is brighter than the English kaolins, which are primary clays, and has the additional advantage of being capable of being prepared into coating colors having higher solids contents than can be realized with the English clays.

However, slurries of the floated clay may be less stable with respect to viscosity than slurries of unfloated fractionated clay from the same sedimentary crude. This is especially the case when temperatures slightly above normal room temperature (70° F.) are encountered during transportation or storage of the aqueous clay-water systems. For reasons not fully understood, high solids slurries of some flotation beneficiated kaolin clays may increase in viscosity at an unusually rapid rate. The problem frequently occurs in hot weather when the slurries are being shipped in tank cars in spite of the fact that storage of the slurries under quiescent conditions at similar temperatures results in minimal thickening.

Following the discovery that there may be a substantial growth in microorganisms in some aged slurries of beneficiated kaolin clays, several types of germicides were added to the slurries before bacterial growth had advanced. As a result, the useful lives of kaolin slurries were increased. With one type of floated clay, for example, the useful life was prolonged by about a month when the slurry was stored at normal temperature. However, when a portion of the same slurry was maintained at elevated temperature with agitation such as occurs during shipment in a tank car, excessive thickening occurred before the month had elapsed.

There has been a long-felt need to provide high solids slurries of flotation beneficiated kaolin clay having greater stability than could be realized by adding anti-microbial agents to condensed phosphate dispersed slurries. In attempts to provide the viscosity-stabilized slurries, it was discovered that, depending upon the sources of the clays and the processing which the clays had undergone, kaolin clay pigments differ substantially in their response to the presence of sodium condensed phosphate dispersants alone and in combination with various organic polymeric polyanionic dispersants. For example, it was found that a dispersant system that effectively stabilized a mechanically delaminated unfloated Georgia kaolin clay was virtually ineffective with undelaminated flotation-beneficiated kaolin clay from Georgia.

THE INVENTION

An object of this invention is to provide viscosity-stable high solids slurries of flotation-beneficiated kaolin clay.

A specific object is to provide slurries which have a desirably low viscosity when freshly prepared and maintain substantially the initial viscosity under virtually all transportation and storage conditions likely to be encountered.

Stated briefly, fluid storage-stable slurries of the present invention comprise water, flotation-beneficiated sedimentary kaolin clay at a concentration of at least 68% by weight, tetrasodium pyrophosphate (TSPP) in amount sufficient to deflocculate said clay in said water and provide a fluid slurry having substantially minimum viscosity (Brookfield at 10 r.p.m.) and a water-soluble organic polyanionic polymer in amount such that the initial viscosity of said mixture of water, clay and TSPP is not altered substantially by the presence of the polymer.

In an embodiment of the invention an improved "predispersed" clay product comprises a spray-dried mixture of the flotation-beneficiated kaolin clay, a dispersant-effective amount of TSPP and a small amount of a soluble organic polyanionic polymer.

Clay slurries within the scope of the invention are characterized by having more uniform viscosity (low shear) when subjected to conditions frequently encountered during shipment and storage than slurries containing the same clay and a condensed phosphate as the sole deflocculating agent. These conditions include shear such as employed when slurries are pumped with recycle pumps during storage and elevated temperature, e.g., the 110° F. to 120° F. temperatures encountered in many storage tanks. The slurries remain fluid at elevated temperatures even when they are subjected to a reciprocating action such as occurs during shipment in a tank car. The high shear viscosity of the slurries (as measured for example by Hercules or Hagan instruments) is not substantially affected by the presence of the polymers.

An essential feature of the invention resides in the use of tetrasodium pyrophosphate as the species of condensed phosphate dispersant. When other condensed phosphate salts, namely, sodium hexametaphosphate and sodium tripolyphosphate, are substituted for the tetrasodium pyrophosphate and are employed with the organic polyanionic polymers, the slurries of flotation-beneficiated clay lack the desired viscosity stability and resistance to gelation.

Another feature resides in the presence in the deflocculated slurry of the combination of the tetrasodium pyrophosphate with the organic polymeric polyelectrolyte. Organic polymers that effectively stabilize the viscosity of the slurries when used with the TSPP are incapable of completely deflocculating high solids slurry of the floated clay when used alone, irrespective of the quantity of organic polymer that is used.

The accompanying figure is a graph plotting the Brookfield viscosities (10 r.p.m.) of four deflocculated 70% solids slurry of flotation beneficiated clay vs. the number of days that each slurry was aged at 110° F. One of the slurries contained 0.30% TSPP (based on the clay weight) as the sole dispersant; another contained 0.30% TSPP plus an organic sulfur germicide; a third contained 0.30% TSPP plus 0.10% of a low molecular weight sodium naphthalene sulfonate - formaldehyde condensate; the fourth was the same as the third except that 0.05% germicide was also present.

PRIOR ART

We are aware of the fact that organic polymeric polyelectrolytes have been used as clay dispersants. An article by J. R. Hern and J. H. Fritz, "Auxiliary Dispersants for Pigments and Pigmented Coatings," TAPPI, December 1966, Vol. 49, No. 12, 77–88A, describes the use of certain organic polyelectrolytes as auxiliary dispersants in conjunction with sodium polyphosphates to deflocculate coating pigments including various clays. As described in the article, the auxiliary dispersant and condensed phosphate were employed in relative proportions such that the auxiliary dispersants reduced substantially the initial viscosity of the clay-water systems. For example, a 65% solids slurry of English clay which had an initial Brookfield (10 r.p.m.) viscosity of 7000 cps. when it contained 0.2% TSPP was reduced to a viscosity of about 500 cps. when 0.2% sulfonated naphthalene formaldehyde condensate was also present. Thus, a gel was present when the TSPP was employed in the absence of the organic polymer; when the organic polymer was added the system was a fluid. In contrast, in carrying out our invention the proportions of polyphosphate and organic dispersant are such that the organic dispersant has minimal effect on the viscosity of the fresh slurry. Thus, our slurries have similar initial viscosities whether or not the organic dispersant is employed in conjunction with the polyphosphate.

DESCRIPTION OF THE INVENTION

A preferred organic polymer is an alkali metal naphthalene sulfonate-formaldehyde condensate, preferably a low molecular weight grade of such polymer (e.g., a polymer having a molecular weight below 1500). Other useable polymers include ethylene-maleic anhydride copolymer, styrene-maleic anhydride copolymer, polyacrylate-terpolymer sodium salt and polyitaconate sodium salts. The organic polymers must be in hydrolyzed condition when present in the slurries; therefore, when a polymer, e.g., ethylene-maleic anhydride copolymer, is not hydrolyzed as supplied, the polymer must be hydrolyzed before use or in situ in the clay-water system. As mentioned, the organic polymer should not substantially increase or decrease the initial viscosity of the TSPP deflocculated clay-water system. The change in initial viscosity of a slurry as a result of the presence of the polymer should not exceed about 200 cps. (Brookfield at 10 r.p.m. with a #3 spindle). Preferably, the organic polymer should not increase or decrease the viscosity by more than 100 cps.

The quantity of TSPP that is employed should be sufficient to form a well-deflocculated high solids slurry having an initial apparent viscosity below about 1000 cps. in the absence of the organic polymer. Especially preferred is the use of a quantity of TSPP that would produce a slurry having an initial apparent viscosity below 600 cps. (Apparent viscosity is measured with a Brookfield viscometer at 10 r.p.m. with a #3 spindle.)

The quantity of TSPP required to defloccculate the slurry of beneficiated clay varies with the source of the clay. With clay from a soft crude, TSPP is generally employed in amount within the range of 0.20% to 0.40%, preferably about 0.25% to 0.35%, based on the moisture-free weight of the clay in the slurry. Flotation beneficiated kaolin from a hard crude generally requires the use of a larger proportion of TSPP. Using clay from a hard crude, TSPP is employed in amount within the range of 0.25% to 0.70%, especially 0.30% to 0.40%, based on the moisture-free weight of the clay.

The quantity of organic polymer employed is generally within the range of 0.05% to 0.20% of the moisture-free clay weight. When too much polymer is employed, the initial viscosity of the slurry is undesirably affected. On the other hand, when insufficient organic polymer is incorporated, the slurry lacks the viscosity stability that it would possess if larger quantities of organic polymer were employed. Especially good results have been achieved when the organic polymer was present in amount within the range of 0.075% to 0.10% of the moisture-free clay weight.

The pH of a deflocculated slurry within the scope of the present invention is within the range of 5.5 to 7.5. Slurries having a pH within the range of 6.5 to 7.0 frequently have better stability than slurries that are more basic or acidic. Sodium hydroxide solution is recommended for adjusting the pH of the slurry when such adjustment is indicated.

Flotation-beneficiated soft kaolin clay may be obtained by processing a crude from a deposit of soft sedimentary crude such as the crudes found in the central part of Georgia. These crudes contain a substantial quantity of plus 2 micron particles in the form of booklets or stacks of well-cystallized hexagonal clay platelets. The hard crudes, exemplified by the gray Georgia kaolins, are composed of much finer particles and frequently require an oxidation-reduction bleach. The clay particles in the hard crudes tend to be less well-crystallized than the clay in the soft crude.

To prepare the clay for flotation, the crudes are blunged, dispersed in water and degritted. Normally the dispersions are fractionated to reduce the quantity of plus 2 micron particles to an amount not exceeding about 20% by weight. The slip of the fine clay is dispersed with sodium silicate (unless sufficient sodium silicate is already present). The dispersed slip is then agitated ("conditioned") with an alkali and reagent(s) that selectively attach to colored titaniferous impurities normally present in sedimentary kaolin clays. The selective reagent generally includes a fatty acid or mixture of fatty and resin acids such as tall oil acids. The acid may be partially or wholly saponified when incorporated in the pulp. An emulsifying agent such as an oil-soluble petroleum sulfonate salt may also be added. Normally a hydrocarbon oil such as fuel oil is added to control the froth. A finely divided, reagentized mineral or solid, such as tall oil-coated calcite, may be incorporated to aid in the flotation of the finely divided colored impurities from the clay. Reference is made to U.S. 2,990,958 to Ernest W. Greene et al. as to suitable proportions of flotation reagents and conditioning procedures.

The pulp is aerated by introducing air bubbles under the surface of the pulp or by other means. This reagentized impurities and additive float, leaving purified clay dispersed in the pulp in the flotation machine. The froth is withdrawn from the machine and it is normally cleaned one or more times by aerating it without addition of reagents. The flotation machine discharge product or tailings are combined and contain the dispersed flotation purifed clay. The organic flotation reagents report for the most part in the froth although trace quantities may be present in the dispersed pulp.

The machine discharge product (or combined machine discharge products) is partially dewatered by adding an acidic material such as alum or sulfuric acid. This flocculates the pulp and permits the removal of pulp water by decantation. The thickened acidic pulp is usually bleached. A hydrosulfite salt such as zinc hydrosulfite is a suitable bleaching reagent although other bleaching reagents may be employed. The pulp of bleached clay is dewatered. Filtration is normally employed although other methods may be used. The dewatered clay may be washed to reduce the soluble salt content. In commercial practice it may not be feasible to remove all soluble material during washing.

When the clay has been dewatered by filtration, the filter cake usually contains about 55% to 60% clay solids. The term "clay solids" refers to a value obtained by making the following calculation:

Percent clay solids
$$= \frac{\text{Clay weight (moisture—free basis)}}{\text{Clay weight (including free moisture)} + \text{water}}$$

Moisture-free clay weight (dry weight) is determined by heating the clay to essentially constant weight at 220° F.

In the past, the moist dewatered clay would be fluidized by adding a condensed phosphate dispersant. Using about 0.20% to 0.50% TSPP, based on the moisture-free clay weight, with a filter cake containing 55% to 60% solids, a fluid, sprayable slurry would be formed. This slurry would be dried to form a "predispersed" clay product which could be shipped in dry form. Alternatively, a high solids slurry containing at least 68% solids would be prepared for shipment in a suitable tank car. To prepare the high solids slurry, the predispersed clay would be blended with filter cake and additional sodium condensed phosphate dispersant added until an optimum proportion of dispersant was present and the slurry had a viscosity within the range of about 300 to 1000 cps., preferably below 60 cps. (Brookfield at 10 r.p.m. with a #3 spindle).

In carrying out the present invention, prior practice may be modified by incorporating the organic polymer into a slurry of clay with TSPP before the slurry is spray dried. Sodium hydroxide may be added to the slurry to adjust pH to about 7 before the spray drying. The resulting microspheres, with or without added caustic, have improved storage properties when stored in dry condition at elevated temperature. When the dry predispersed clay containing the polymeric additive is formed into a high solids slurry, the slurry has improved aging properties.

Various methods may be used to incorporate the TSPP and polymer when the clay is to be supplied in the form of a high solids fluid slurry. For example, spray dried microspheres containing TSPP and organic dispersant may be blended with a filter cake to bring the solids level to at least 68% and additional TSPP and polymer added with mixing. Alternatively, spray dried microspheres containing TSPP without organic polymer may be blended with filter cake, followed by further addition of TSPP and the organic polymer. Sodium hydroxide in amount sufficient to provide a neutral product may be incorporated in part or whole before the spray drying step. Alternatively, part or all of the caustic may be added to the slurry after addition of predispersed clay to the filter cake. In many cases the addition of the caustic has a beneficial effect on initial viscosity and storage stability.

As will be shown in an accompanying example, it may be desirable to incorporate a small amount of a germicide in the high solids slurry. Recommended is the use of 3,5 - dimethyl - tetrahydro - 1,3,5,2H - thiadiazine - 2 - thione (supplied, for example, under the trade name "D3TA") in amount within the range of 0.005% to 0.10%, preferably about 0.05%, based on the clay weight. The germicide should be incorporated with the clay slurry after a spray drying step. Frequently, the use of a combination of such germicide and organic polyanionic polymer has an unexpectedly beneficial effect.

High shear or low shear agitation may be used to prepare ("makedown") the clay-water slurries. The slurries contain at least 68% solids, usually about 70% to 71% solids. With some flotation-beneficiated clays, slurries containing up to 74% solids may be prepared. It is within the scope of the invention to subject the fluid high solids deflocculated slurries to intensive agitation after the "makedown" step for the purpose of reducing the viscosity of slurry.

When initial viscosity is determined on a slurry prepared with low shear agitation (such as a Sears Modified Drill Press Mixer), the slurry should be allowed to reach equilibrium conditions by standing for 24 hours at ambient temperature before initial Brookfield viscosity is measured. The apparent viscosity of slurries prepared with high shear equipment may be measured immediately after the slurries are prepared.

The slurries of the invention may be formulated into coating colors using conventional techniques. Adhesives such as cooked starch, casein and latices such as acrylics or styrene-butadiene may be used. The proportion of adhesive to clay is usually within the range of 5 to 20 parts by weight adhesive solids to 100 parts by weight clay, moisture-free clay weight basis.

The coating colors are useful in the preparation of coated publication paper. However, the invention is not limited to this specific use.

The following examples demonstrate some presently preferred methods for practicing the invention and illustrate benefits of the invention.

Example I

In this example an organic polyanionic polymer was dissolved in a 70% solids slurry of TSPP-deflocculated floated kaolin clay in amount such that the organic polymer did not substantially affect the initial low shear viscosity of the slurry. The example demonstrates that, when employed in this manner, the organic polymer functioned as a viscosity stabilizing agent.

The flotation-beneficiated clay employed in the tests described in the example was obtained from a soft Georgia crude representative of the crudes that are the sources of conventional No. 1 grade domestic coating clays.

To prepare the crude for flotation, the crude was blunged in water and the pulp was deflocculated by adding sodium silicate. The dispersed pulp was degritted and then fractionated to obtained a slip of fine clay in which at least 90% by weight of the particles were finer than 2.0 microns (equivalent spherical diameter). The dispersed slip of clay was subjected to anionic froth flotation in an alkaline circuit. The flotation reagents included minus 325 mesh calcite and an emulsion containing 4.5 lbs./ton tall oil acids (mixture of about 80% fatty acid and 20% resin acid) and 1.5 lbs./ton "Calcium Petronate®," an oily solution of a petroleum sulfonate salt. Fuel oil was added to control the flotation. The froth, which was an intimate mixture of reagentized yellow-brown titaniferous impurity and calcite, was cleaned three times by flotation without addition of reagents. The machine discharge products containing the purified clay were combined, flocced by addition of sulfuric acid to a pH of about 2.5, thickened, bleached with zinc hydrosulfite, filtered and washed. The resulting acidic filter cakes were blended and used in the tests to be described. The cakes contained about 60% solids.

In a control test, a portion of the acidic filter cake containing the bleached, flotation-beneficiated kaolin clay was fluidized by adding TSPP in an amount of 0.30%, based on the dry weight of the clay. The pH of the slip was then adjusted to 7.0 by adding a 10% solution of sodium hydroxide. The slip was screened through a 325 mesh (Tyler) screen and spray dried with a chamber temperature of about 335° F. and an air outlet temperature of about 115° F. to 120° F. A predispersed clay product in the form of microspheres was obtained, the product being representative of a predispersed, floated, bleached No. 1 grade coating clay.

Another portion of the filter cake blend was processed in the same manner as the control except that after the 0.30% TSPP had been added, "Lomar® PW" was added in amount of 0.10% based on the moisture-free clay weight. ("Lomar PW" is solid sodium naphthalene sulfonate-formaldehyde condensate reported to have a molecular weight of about 900.) The pH of this fluid slip was also adjusted to 7.0 by addition of a 10% solution of sodium hydroxide before the slip was spray dried.

Dispersed slurries containing 70% clay solids and various dispersants were prepared as follows. The spray dried products described above were blended with portions of the acid cake in amount to produce 70% solids slurries. The appropriate additional dispersant or dispersant mixture was then added. For example, after the spray dried clay containing 0.30% TSPP and 0.10% "Lomar PW" was mixed with the acid cake, additional TSPP and "Lomar" were added in proportion to bring the total TSPP and "Lomar" to 0.30% and 0.10%, respectively, based on the total weight of the dry clay. In making up the 70% solids slurries the spray dried material was added to the cake with low shear and the mixture was mechanically worked by means of high shear agitation for 5 minutes.

The procedure was repeated with the control slip and the slip containing the sodium napthalene sulfonate-formaldehyde condensate ("Lomar PW") with the exception that "D3TA" was added in amount of 0.05% of the clay weight after addition of the "Lomar PW" and before the high shear mixing.

The slurries were placed in tared, covered beakers and aged under conditions simulating conditions encountered during the transport of the slurry and handling in a paper coating plant. In carrying out the test, 500 g. of each slurry was weighed in a 600 ml. tall form glass beaker and the beaker was covered with polyethylene film. The beakers were placed in a water bath provided with means for continuously reciprocating the beakers horizontally at a low rate of speed ("Eberbach Water-Bath Shaker"). The shaker was set for slow speed (3.25 setting) and short stroke to avoid splashing and loss of water from the bath. During testing water bath temperature was maintained at 110° F. Samples were periodically removed from the bath, cooled, readjusted for solids, stirred until uniform, checked for viscosity, reweighed, covered and returned to the bath.

Brookfield viscosity and pH measurements were made periodically over a two-week period. In measuring viscosity, the slurry to be tested was stirred with a spatula to insure that the clay was in suspension. After an interval of 10 minutes, viscosity was measured again. The 10-minute interval was employed in order to determine whether gelation would occur after all the clay had been suspended. A Brookfield viscosity (10 r.p.m.) in excess of $5 \times 10^3$ cps. indicated severe gelling.

The accompanying figure is a plot of the Brookfield viscosity of the 70% slurries after aging for various periods at 110° F.

Data in the figure show that when 0.30% TSPP was used alone to disperse the flotation-beneficiated clay, the viscosity rapidly increased from an initial value of about $4 \times 10^2$ centipoises to a value in excess of $3 \times 10^3$ in four days. After seven days the slip had gelled (viscosity in excess of $5 \times 10^3$). After fourteen days the viscosity of the 70% solids slurry was $1 \times 10^4$ centiposes. When a germicide ("D3TA") was present with the TSPP and an organic polyelectrolyte was absent, the viscosity of the slurry underwent an initial rapid increase in viscosity over a four-day period. Although subsequent aging at the elevated temperature did not bring about a further substantial increase, the viscosity of the slurry in which an organic polymer was absent remained above $1.5 \times 10^3$ cps.

When 0.10 "Lomar PW" was used with 0.30% TSPP (without germicide), the slurry underwent a slight gradual increase in viscosity as it aged. The increase was very slight and after fourteen days the viscosity was less than $7 \times 10^2$ cps., virtually the same as the viscosity of the slurry containing TSPP alone with "D3TA" after it had aged only two days.

Thus, while the viscosities of slurries containing TSPP alone or TSPP plus germicide increased by almost 9,500 cps. and 1,800 cps., respectively, when aged at 110° F. over a two-week period, the slurry containing TSPP and organic polyelectrolyte without a germicide underwent a viscosity increase of only about 200 cps. during the same period. When the germicide was present with the TSPP and "Lomar PW," the viscosity of the slurry was further stabilized; after aging 2 weeks at the elevated temperature there was an increase in viscosity of only 170 centipoises.

Thus, the presence of 0.10% "Lomar PW" (based on the clay weight) prevented the five-fold increase in slurry viscosity that occurred when the TSPP deflocculated slurry was stabilized with the germicide, indicating that 0.10% "Lomar PW" was markedly more effective than the germicide. The data show also that a further increase in stability was accomplished by using the germicide with the "Lomar PW" and TSPP.

Example II

This example illustrates that it may be beneficial to neutralize a 70% solid slurry of flotation-beneficiated kaolin when dispersing the slurry with a combination of TSPP and "Lomar PW."

The general procedure of Example I was repeated with another portion of the filter cake to form a neutral (pH 7.0) 70% solids slurry containing 0.30% TSPP, 0.10% "Lomar PW" and 0.05% "D3TA" (all based on the moisture-free clay weight). This procedure was repeated except that sodium hydroxide solution was not added to adjust the pH. The resulting 70% solids slurry had a pH of 6.4.

The two slurries were aged at 110° F. in the shaker, as described above, and apparent viscosity measurements were made.

The slurry having a pH of 6.4 had an initial Brookfield viscosity (10 r.p.m.) of 340 cps.; after 2 weeks at 110° F. in the shaker, viscosity had increased to 640 cps., an increase of 300 cps. The initial viscosity of the slurry having a pH of 7.0 was 400 cps., after 2 weeks under the same aging conditions, the viscosity had increased by only 60 cps. Thus, by adjusting the pH to 7.0, the viscosity of the slurry of floated clay containing TSPP and "Lomar PW" was further stabilized.

Example III

The following tests simulate dry storage conditions in a silo and were carried out to demonstrate that the presence of "Lomar PW" with TSPP improves the storage stability of dry "predispersed" flotation-beneficiated clay.

Acid filter cakes of bleached flotation-beneficiated soft Georgia kaolin clay were obtained in the same manner described in Example I except that the tall oil acid mixture and fuel oil were the only organic flotation reagents that were employed. The cakes were blended and one portion was dispersed with 0.30% TSPP (based on the moisture-free clay weight) before spray drying; another portion was dispersed with 0.30% TSPP and 0.10% "Lomar PW." The spray dried microspheres were placed in a 150° F. oven to simulate dry storage in a silo.

Samples of the microspheres were withdrawn from the oven after they had been aged for 42 days. The microspheres and a sample of microspheres that had not been stored at elevated temperature were formed into 71% solids slurries by subjecting appropriate amounts of microspheres and water to high shear mixing. Slurries were cooled to 70° F. and solids were adjusted to 71%. The results for testing initial viscosities are summarized in Table I.

TABLE I.—EFFECT OF SODIUM NAPHTHALENE-FORMALDEHYDE SULFONATE CONDENSATE ON DRY STORAGE STABILITY OF TSPP PREDISPERSED FLOTATION-BENEFICIATED KAOLIN MICROSPHERES

| Dispersant in dry aged microspheres, wt. percent | | Initial Brookfield viscosity (10 r.p.m.) of slurry, centipoises | |
|---|---|---|---|
| TSPP | "Lomar PW" | Unheated microspheres | Microspheres aged 42 days at 150° F. |
| 0.30 | | 430 | 1,140 |
| 0.30 | 0.10 | 470 | 500 |

Data in Table I show that when the sodium naphthalene sulfonate-formaldehyde condensate was not present with the TSPP dispersant, the viscosity of a 71% solids slurry made from the microspheres aged at 150° F. increased from 430 cps. to 1140 cps. as a result of aging the microspheres for 42 days at the elevated temperature. When the organic polymeric polyelectrolyte was present, the viscosity of a 71% solids slurry prepared with the predispersed microspheres was virtually unchanged as a result of aging the microspheres for 42 days at the elevated temperature.

Hercules end-point viscosities (which represent viscosity under high shear rates) were substantially unaffected by the presence of the "Lomar PW."

Example IV

This example illustrates the use of various polymeric polyelectrolytes as stabilizers for high solids slurries of flotation-beneficiated kaolin clay. The organic polyelectrolytes are identified as follows.

"Darvan® No. 7"—Sodium salt of carboxylated polyelectrolyte

"Blancol® N"—Sodium salt of sulfonated naphthalene-formaldehyde condensate

"Tamol® 850"—Sodium salt of polyacrylate terpolymer (25% solution)

Samples of a filter cake from the flotation operation described in Example I were dispersed with various quantities of TSPP and the pH of each slurry was adjusted to 7 by addition of a 10% sodium hydroxide solution. The slurries were spray dried as in Example I. Samples of the predispersed clay were redispersed at 70% solids with various organic dispersants using a Sears Modified Drill Press Mixer. A control without organic dispersant was dispersed at 70% solids. All slurries contained 0.05% "D3TA" as a preservative, the additive being incorporated to the 70% solids slurries before addition of the organic dispersant when an organic dispersant was employed.

Stability of each slurry was tested at 130° F. in the shaker described in Example I. The control slurry (0.30% TSPP) based on the moisture-free clay weight, had an initial Brookfield viscosity of 590 centipoises at 10 r.p.m. After one week, however, the Brookfield viscosity was $5 \times 10^6$ centipoises and the slurry had gelled. With a slurry containing 0.20% TSPP and 0.10% Darvan 7, each based on the moisture-free clay weight, initial 10 r.p.m. Brookfield viscosity was 650 centipoises. After one week viscosity was 700 centipoises. Slight gelation did not occur until this slurry was aged for 2 weeks at the elevated temperature. Similar results were obtained with: 0.20% TSPP and 0.10% "Blancol" N, 0.20% TSPP and 0.10% "Tamol 850" and 0.20% TSPP and 0.10% "Lomar PW."

After aging for 5 weeks, the control containing .30% TSPP had thickened to a heavy gel. Slurries prepared with the organic polyanionic polymers and TSPP were considerably thinner. The slurry containing 0.20% TSPP and 0.10% "Tamol 850" was the most fluid.

Example V

This example further illustrates the use of various organic polymeric polyelectrolytes with tetrasodium pyrophosphate to stabilize high solids kaolin slurries. In this example, a small quantity of "D3TA" was also present. Storage was under quiescent conditions.

A filter cake of bleached flotation-beneficiated Georgia kaolin clay was obtained by the procedure of Example I. The cake was fluidized by adding TSPP or a mixture of TSPP and an organic polyanionic polymer. A portion of each dispersed slurry was spray dried. Seventy percent solids dispersions were prepared by adding spray dried products to fluidized filter cakes to increase the solids content to 70.0%. To a portion of each dispersion, "D3TA" was added in amount of 0.05% of the moisture-free clay weight and pH was adjusted to about 7 by addition of sodium hydroxide solution.

A portion of each slurry was aged in a sealed glass jar at room temperature. Another portion was aged in a sealed glass jar in a 130° F. oven. The results, summarized in Table II, show that the organic polymers were effective in stabilizing the viscosity of the TSPP dispersed clay slurries.

EXAMPLE VI

A portion of the filter cake of Example I was dispersed by adding 0.30% TSPP, 0.10% "Lomar PW" and 10% sodium hydroxide solution to a pH of 7.0. The slurry was spray dried as described in Example III. The microspheres were prepared in a 70% solids slurry. "D3TA" was added in amount of 0.05% of the clay weight. The slurry was aged for 2 weeks at 110° F. in the Eberbach shaker.

TABLE II.—EFFECT OF ORGANIC POLYANIONIC POLYMERS ON THE VISCOSITY STABILITY OF 70% SOLIDS SLURRIES OF FLOTATION BENEFICIATED CLAY

| Dispersant system, wt. percent | | Storage, °F. | Brookfield viscosity, cp. (10 r.p.m.) | | | Gel formation |
|---|---|---|---|---|---|---|
| TSPP | Others | | Initial | 7 days | 4 weeks | |
| 0.30 | None | RT | 560 | 570 | 6×10⁶ | Thin gel after 1 week. |
| 0.30 | do | 130 | 560 | 6.5×10⁶ | | Thick gel after 1 week. |
| 0.20 | 0.10 "Darvan 7" | RT | 650 | 650 | 850 | Slight gel after 7 days. |
| 0.20 | do | 130 | 650 | 930 | 1.3×10⁶ | Do. |
| 0.20 | .10 "Blancol N" | RT | 450 | 460 | 610 | Do. |
| | | 130 | 450 | 650 | 1.3×10⁶ | Do. |
| 0.20 | 0.10 "Lomar PW" | RT | 450 | 390 | 610 | Do. |
| | | 130 | 450 | 540 | 1.3×10⁶ | Do. |
| 0.20 | {0.10 "Lomar PW" 0.05 D3TA | RT | 440 | 400 | 370 | Slight gel after 2 weeks. |
| | | 130 | 440 | 510 | 1.5×10⁶ | Very slight gel after 7 days. |

NOTE.—RT=Room temperature.

A similar slurry was prepared without an organic polymeric dispersant. This slurry was aged under the same conditions.

Coating colors were prepared from each slurry by separately mixing each aged deflocculated clay slurry with a 50/50 blend of alpha protein and styrene-butadiene latex ("Dow 636") using 18 parts binder solids to 100 parts clay solids. The coating colors were applied to 42 lb./ream (3000 ft.²) Oxford base stock at a coat weight of 10 lb./ream. The coated sheets were dried and supercalendered. The coated sheets with and without organic dispersant were tested by standard test methods.

It was found that there was no significance between the 75° gloss, brightness, opacity, IGT pick strength and gloss ink holdout, indicating that the presence of the organic dispersant did not adversely affect sheet properties.

EXAMPLE VII

Gray (hard) clay from a mine near McIntyre, Georgia was dispersed, degritted, fractionated and beneficiated by froth flotation in the presence of emulsified tall oil acids and calcite. The flotation-beneficiated clay was flocced by addition of acid, thickened, bleached in an acid pulp with potassium permanganate and then zinc hydrosulfite, filtered and washed to a specific resistance of 7000 ohms.

A 70% solids slurry of the clay containing 0.40% TSPP (based on the moisture-free weight of the clay) had an initial Brookfield 10 r.p.m. viscosity of 920 cps. A similar slurry having a pH of 6.8 as a result of the addition of sodium hydroxide solution had an initial apparent viscosity of 1050 cps. When the substantially neutral slurry was aged for 2 weeks at 110° F. in a container in the shaker bath, the viscosity of the 70% solids slurry increased to 2700 centipoises.

When a 70% solids slurry of the same clay was prepared by adding 0.4% TSPP, based on the clay weight, 0.10% "Lomar PW," based on the clay weight, and sodium hydroxide to adjust pH to 6.9, the slurry had an initial apparent viscosity of 620 centipoises; after aging for 2 weeks at 110° F. the viscosity was 650.

These data show that the neutral slurry of flotation-beneficiated hard kaolin which did not contain a polymer underwent a 1650 cps. increase in viscosity during the storage stability test at elevated temperature. In contrast, the viscosity of a similar slurry which also contained an organic polymer was virtually unchanged when stored under the same conditions.

Thus, it has been demonstrated that the apparent viscosity of high solids slurries of various flotation beneficiated clays may be stabilized against thickening as the result of being stored at elevated temperature by formulating the slurries with sufficient TSPP to completely deflocculate the clay and incorporating a small quantity of an organic polyanionic polymer which has a minimal effect on the initial viscosity of the slurry.

We claim:

1. A viscosity-stable deflocculated aqueous slurry of kaolin clay comprising water,
   at least 68 percent by weight of flotation beneficiated kaolin clay containing not more than 20 percent by weight of particles larger than 2 microns, said clay being selected from the group consisting of hard kaolin clay and soft kaolin clay.
   tetrasodium pyrophosphate in amount within the range of 0.20 percent to 0.40 percent, based on the moisture-free clay weight, in the case that said clay is soft kaolin clay, and an amount within the range of 0.25 percent to 0.70 percent, based on the moisture-free clay weight, in the case that said clay is hard kaolin clay, the amount of tetrasodium pyrophosphate being sufficient to form a fluid slurry having minimum apparent Brookfield 10 r.p.m. viscosity, said minimum viscosity being below 1000 cps., and
   a soluble salt of a polyanionic organic polymer in amount within the range of 0.05 percent to 0.20 percent, based on the moisture-free clay weight, the amount of said polyanionic organic polymer being such that it does not increase or decrease the apparent Brookfield 10 r.p.m. viscosity of the slurry containing said amount of tetrasodium pyrophosphate by more than 200 cps. but being sufficient to maintain the viscosity of the slurry at a substantially constant value when the slurry is aged at elevated temperature.

2. The slurry of claim 1 wherein said polyanionic organic polymer is a soluble salt of naphthalene sulfonate-formaldehyde condensate.

3. The slurry of claim 2 wherein said polymer is a sodium salt having a molecular weight less than 1500.

4. The slurry of claim 1 having a pH of about 7 as a result of the presence of sodium hydroxide.

5. Improved predispersed spray dried microspheres of flotation beneficiated kaolin clay containing not more than 20 percent by weight of particles larger than 2 microns, said microspheres comprising a spray dried mixture of:
   flotation beneficiated kaolin containing not more than 20 percent by weight of particles larger than 2 microns, said clay being selected from the group consisting of hard kaolin clay and soft kaolin clay,
   tetrasodium pyrophosphate in amount within the range of 0.20 percent to 0.40 percent, based on the moisture-free clay weight, in the case that said clay is soft kaolin clay, and an amount within the range of 0.25 percent to 0.70 percent, based on the moisture-free clay weight, in the case that said clay is hard kaolin clay, the amount of tetrasodium pyrophosphate being such that a 70 percent solids slurry obtained by dispersing said microspheres in water has minimum apparent Brookfield 10 r.p.m. viscosity, said viscosity being below 1000 cps., and
   a soluble salt of a polyanionic organic polymer in amount within the range of 0.05 percent to 0.20 percent, based on the moisture-free clay weight, the amount of said polyanionic organic polymer being such that it does not increase or decrease by more than 200 cps. the apparent Brookfield 10 r.p.m. viscosity of said slurry of clay containing said amount of tetrasodium pyrophosphate, the amount of said polyanionic organic polymer being sufficient to maintain the viscosity of the slurry at a substantially constant value when the slurry is aged at elevated temperature.

6. The spray dried microspheres of claim 5 wherein said polymer is a sodium salt having a molecular weight less than 1500.

7. The spray dried microspheres of claim 5 which also contain sodium hydroxide in amount such that a 70 percent solids aqueous slurry of the microspheres has a pH of about 7.

References Cited

UNITED STATES PATENTS

| 2,709,661 | 5/1955 | Dietz | 106—118 |
| 3,130,063 | 4/1964 | Millman et al. | 106—288I |
| 3,341,340 | 9/1967 | Sawyer et al. | 106—72 |
| 3,372,043 | 3/1968 | Fanselow | 106—72 |

JAMES E. POER, Primary Examiner

U.S. Cl. X.R.

106—72